(12) United States Patent
Kruglick (10) Patent No.: US 9,405,666 B2
(45) Date of Patent: Aug. 2, 2016

(54) HEALTH MONITORING USING SNAPSHOT BACKUPS THROUGH TEST VECTORS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 103 days.

(21) Appl. No.: 14/342,333

(22) PCT Filed: Jun. 3, 2013

(86) PCT No.: PCT/US2013/043940
§ 371 (c)(1),
(2) Date: Feb. 28, 2014

(87) PCT Pub. No.: WO2014/196954
PCT Pub. Date: Dec. 11, 2014

(65) Prior Publication Data
US 2015/0347286 A1    Dec. 3, 2015

(51) Int. Cl.
*G06F 11/00* (2006.01)
*G06F 11/36* (2006.01)
(Continued)

(52) U.S. Cl.
CPC ........ *G06F 11/3692* (2013.01); *G06F 11/1464* (2013.01); *G06F 11/36* (2013.01); *G06F 11/3684* (2013.01); *G06F 11/3688* (2013.01); *H04L 43/50* (2013.01); *G06F 2201/84* (2013.01); *H04L 41/5012* (2013.01); *H04L 41/5038* (2013.01); *H04L 41/5096* (2013.01); *H04L 43/0817* (2013.01); *H04L 43/0852* (2013.01); *H04L 43/0888* (2013.01)

(58) Field of Classification Search
CPC ............ G06F 11/1464; G06F 11/3684; G06F 11/3688; G06F 11/3692; G06F 2201/84
See application file for complete search history.

(56) References Cited

U.S. PATENT DOCUMENTS 7,389,313 B1 *   6/2008   Hsieh ................ G06F 17/30575
8,006,116 B1     8/2011   Sobel et al.
(Continued)

OTHER PUBLICATIONS

"Automated Test Generation (ATG)," accessed at http://web.archive.org/web/20120911011747/http://research.microsoft.com/en-us/projects/atg, accessed on Jan. 27, 2014, pp. 1-1.
(Continued)

*Primary Examiner* — Joshua P Lottich
(74) *Attorney, Agent, or Firm* — Turk IP Law, LLC (57) ABSTRACT

Technologies are described for health monitoring using snapshot backups through test vectors. In some examples, health of an application deployed at a datacenter may be monitored and key metrics recorded in the metadata of progressive backup snapshots of an instance of the application such that warning metrics can be reviewed retrospectively upon failure of the instance and a snapshot can be automatically selected for restoration of the application instance based on lack of high incidence of suspect metric values. Moreover, an operating state associated with snapshot backups may be assessed as the snapshots are captured and selected ones with operating conditions desired as part of a test suite may be saved for use as test scenarios. In particular, state information from added or existing deployment monitoring may be used by a test logic process to evaluate whether each snapshot is needed for testing scenarios.

21 Claims, 7 Drawing Sheets

(51) Int. Cl.
  *G06F 11/14* (2006.01)
  *H04L 12/24* (2006.01)
  *H04L 12/26* (2006.01)

(56) References Cited

U.S. PATENT DOCUMENTS

| | | | |
|---|---|---|---|
| 8,127,096 B1 | 2/2012 | Chatterjee et al. | |
| 8,140,905 B2 | 3/2012 | Beaty et al. | |
| 8,543,542 B2 | 9/2013 | D'Souza et al. | |
| 9,032,369 B2* | 5/2015 | Balakrishnan | G06F 11/3608 717/124 |
| 2005/0283348 A1* | 12/2005 | Tsui | G06F 11/008 703/13 |
| 2008/0028009 A1 | 1/2008 | Ngo | |
| 2010/0251004 A1 | 9/2010 | Schuba et al. | |
| 2010/0281473 A1 | 11/2010 | Zhang et al. | |
| 2011/0010691 A1* | 1/2011 | Lu | G06F 11/3688 717/124 |
| 2011/0022812 A1 | 1/2011 | Van der Linden et al. | |
| 2012/0323853 A1 | 12/2012 | Fries et al. | |
| 2013/0283137 A1* | 10/2013 | Wu | G06F 17/30876 715/205 |
| 2013/0283140 A1* | 10/2013 | Wu | G06F 17/30864 715/207 |

OTHER PUBLICATIONS

"ETW Tracing," accessed at http://web.archive.org/web/20130511173014/http://msdn.microsoft.com/en-us/library/ms751538.aspx, Aug. 2, 2012, pp. 1-3.

"Graphite—Scalable Realtime Graphing," accessed at http://web.archive.org/web/20130524040802/http://graphite.wikidot.com/, accessed on Jan. 27, 2014, pp. 1-9.

"Nagios is The Industry Standard in IT Infrastructure Monitoring," Nagios, accessed at http://web.archive.org/web/20130530114432/http://www.nagios.org/, accessed on Jan. 27, 2014, pp. 1-5.

"Simple daemon for easy stats aggregation," GitHub, accessed at https://github.com/etsy/statsd/, accessed on Jan. 27, 2014, pp. 1-3.

"Test your Backups," accessed at http://web.archive.org/web/20130518025140/http://www.taobackup.com/testing_info.html, accessed on Jan. 28, 2014, pp. 1-3.

"VM backup is the new standard fare," accessed at http://web.archive.org/web/20120619090900/http://itatonce.wordpress.com/2012/06/15/vm-backup-is-the-new-standard-fare/, Jun. 15, 2012, pp. 1-5.

"vSphere Client Hardware Health Monitoring," VMware Technical Note, pp. 1-10, VMware (2010).

Babcock,C., "Amazon Outage Hits Netflix, Heroku, Pinterest, Instagram," accessed at http://web.archive.org/web/20120804055732/http://www.informationweek.com/news/cloud-computing/infrastructure/240003096, Jul. 2, 2012, pp. 1-7.

Bodík, P., et al., "Fingerprinting the Datacenter: Automated Classification of Performance Crises," Proceedings of the 5th European conference on Computer systems, pp. 111-124, ACM (2010).

Bradford, R et al., "Live Wide-Area Migration of Virtual Machines Including Local Persistent State," Proceedings of the 3rd International Conference on Virtual Execution Environments, pp. 169-179, ACM (2007).

Eranki, R., "Scaling lessons learned at Dropbox, part 1," accessed at http://web.archive.org/web/20130401205138/http://eranki.tumblr.com/post/27076431887/scaling-lessons-learned-at-dropbox-part-1, Jul. 12, 2012, pp. 1-7.

Ghosh, D., et al., "Self-healing systems-survey and synthesis," Decision Support Systems, vol. 42, Issue 4, pp. 2164-2185 (2007).

Iyer, R., et al., "Virtual platform architectures for resource metering in datacenters," ACM SIGMETRICS Performance Evaluation Review, vol. 37, Issue 2, pp. 89-90 (2009).

Kaiser, G., et al., "An Approach to Autonomizing Legacy Systems," Workshop on Self-Healing, Adaptive and Self-MANaged Systems, pp. 6 (2002).

Kandula, S., "The Nature of Datacenter Traffic: Measurements & Analysis," Proceedings of the 9th ACM SIGCOMM conference on Internet measurement conference, pp. 202-208, ACM (2009).

Kepes, B., "Google Compute Engine-Day One Analsysis," accessed at http://web.archive.org/web/20130210051950/http://diversity.net.nz/google-compute-engineday-one-analsysis/2012/06/28/, Jun. 28, 2012, apges 1-4.

Losh, S., "Tracking Application-Level Metrics in Amara," Amara Labs, accessed at http://web.archive.org/web/20120719082403/http://labs.amara.org/2012-07-16-metrics.html, Jul. 16, 2012, pp. 1-10.

Margaria, T., et al., "Knowledge-based relevance filtering for efficient system-level test-based model generation," Innovations in Systems and Software Engineering, vol. 1, Issue 2, pp. 147-159 (2005).

McMillan, R., "Netflix to Open Source Army of Cloud Monkeys," Wired, accessed at http://web.archive.org/web/20130521023019/http://www.wired.com/wiredenterprise/2012/04/netflix_monkeys, Apr. 12, 2012, pp. 1-3.

Miller, R., "Generator Fan Failure Triggered AWS Outage," accessed at http://web.archive.org/web/20130529134315/http://www.datacenterknowledge.com/archives/2012/06/21/aws-outage, Jun. 21, 2012, pp. 1-4.

Miller, R., "NGINX Exec Talks about Netflix CDN Open Server Deal," Correl Sense, accessed at http://web.archive.org/web/20130321073157/http://www.real-user-monitoring.com/nginx-exec-talks-about-netflix-cdn-open-server-deal, Jun. 8, 2012, pp. 1-4.

Mishra, A.K., et al., "Towards characterizing cloud backend workloads: Insights from Google compute clusters," ACM SIGMETRICS Performance Evaluation Review, vol. 37, Issue 4, pp. 34-41 (2010).

Oremus, W., "Physical storms can hurt virtual cloud," as Amazon found out, accessed at http://www.tampabay.com/news/business/physical-storms-can-hurt-virtual-cloud-as-amazon-found-out/1238383, Jul. 2, 2012, pp. 1-2.

Perkins, C., "IP encapsulation within IP," Networking Group, RFC 2003, pp. 1-14 (1996).

Preston, W.C., "Can you have a backup system based solely on snapshots and replication?," accesed at http://web.archive.org/web/20130512225959/http://backupcentral.com/mr-backup-blog-mainmenu-47/13-mr-backup-blog/299-snapshots-replication-backups.html, Feb. 5, 2010, pp. 1-11.

Reves, J., and Panchen, S., "Traffic Monitoring with Packet-Based Sampling for Defense against Security Threats," InMon Technology Whitepaper, pp. 9 (2002).

Rushby, J., "Automated Test Generation and Verified Software," Lecture Notes in Computer Science, pp. 1-9 (2008).

Snigh, A., "Extended Snapshots and Replication as Backup," Nimble Storage, accessed at http://web.archive.org/web/20120615015801/http://www.nimblestorage.com/blog/2160/, Feb. 22, 2011, pp. 1-4.

Thorsten., "RightScale Joins Google Compute Engine for Launch Day," accessed at http://web.archive.org/web/20130519164318/http://blog.rightscale.com/2012/06/28/rightscale-joins-google-compute-engine-for-launch-day/, Jun. 28, 2012, pp. 1-4.

Warfield, A., et al., "Facilitating the Development of Soft Devices," Proceedings of the annual conference on USENIX Annual Technical Conference, pp. 4 (2005).

Wellington, B., "Secure Domain Name System (DNS) Dynamic Update," Networking Group, RFC 3007, pp. 1-9 (2000).

International Search Report with Written Opinion for International Application No. PCT/US2013/043940 mailed on Jan. 7, 2014.

"Kiwi Application Monitor";http://www.kiwimonitor.com/kiwi_application_monitor.php, accessed on Feb. 28, 2014.

"Unified IT Monitoring for Your Modern Infrastructure"; http://www.ca.com/us/content/page/ca-nimsoft-solutions.aspx, CA Technologies, accessed on Feb. 28, 2014.

"Application Monitoring Software";http://www.uptimesoftware.com/application-monitoring.php, Up Time Software, accessed on Feb. 28, 2014.

"SQL Server Database Backup and Recovery with Kyplex Snapshot", Kyplex, accessed Aug. 29, 2012.

"Out of the Office . . . snapshot server backup", Product Sheet, Live Vault Server Backup, accessed Feb. 28, 2014.

(56) References Cited

OTHER PUBLICATIONS

"Application monitor," accessed at https://web.archive.org/web/20130509153158/http://www.jockersoft.com/english/appmonitor_index.php, accessed on Dec. 12, 2015, pp. 2.

"Riemann monitors distributed systems," accessed at https://web.archive.org/web/20130516134700/http://aphyr.github.io/riemann/, accessed on Dec. 15, 2015, pp. 3.

"Seamless Integration of Snapshots with Traditional Backup & Recovery Infrastructures," Legato solutions, Whitepaper, pp. 1-14 (Sep. 2003).

* cited by examiner

HEALTH MONITORING USING SNAPSHOT BACKUPS THROUGH TEST VECTORS

CROSS-REFERENCE TO RELATED APPLICATION

This Application is the National Stage filing under 35 U.S.C. §371 of PCT Application Ser. No. PCT/US2013/043940 filed on Jun. 3, 2013. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Traditional bulk backups of data systems are being replaced by snapshots and replication processes in which an initial snapshot of a system is captured, and subsequent snapshots are taken regularly at incremental periods of time. Each subsequent snapshot may capture changes from a prior snapshot, and the snapshots and changes may be assembled to restore a system to a state of a selected snapshot. During snapshot collection, a performance of a system may also be monitored in which various health and performance metrics are collected to monitor how the system operates over a range of states. The captured snapshots and performance data may represent a valuable record of states of a system over a wide array of operating conditions.

With the advance of networking and data storage technologies, an increasingly large number of computing services are being provided to users or customers by cloud-based datacenters that may enable leased access to computing resources at various levels. Often times data and/or applications may be migrated from one cloud to another (for example, from one datacenter to another), where it may be desirable to test a performance of an application at a new datacenter before deciding to migrate the application to the new datacenter. In some testing scenarios, a duplicate of the application may be replicated and run at a destination datacenter to observe a range of operating conditions including specifically known stress states in order to evaluate a performance of the application at the stress states. However, running the duplicate application for long enough to observe naturally occurring stress states may consume valuable time and computing resources.

SUMMARY

The following summary is illustrative only and is not intended to be in any way limiting. In addition to the illustrative aspects, embodiments, and features described above, further aspects, embodiments, and features will become apparent by reference to the drawings and the following detailed description According to some examples, the present disclosure describes methods for generating a test vector in datacenter health monitoring using snapshots. An example method may include collecting a series of snapshots of an application executed at a source computing environment, where the snapshots include metric values associated with monitored health aspects of the application, selecting a snapshot with an operating state desired as part of a test suite, where operating states associated with the snapshots may be assessed as the snapshots may be captured, and providing the selected snapshot to a test logic for use in a test scenario.

According to other examples, the present disclosure also describes servers operable to generate a test vector for datacenter health monitoring using snapshots. An example server may include a memory configured to store instructions; and a processor coupled to the memory, the processor configured to execute a snapshot processing module, where the snapshot processing module may be configured to collect a series of snapshots of an application executed at a source computing environment, where the snapshots include metric values associated with monitored health aspects of the application, select a snapshot with an operating state desired as part of a test suite, where operating states associated with the snapshots may be assessed as the snapshots may be captured, and provide the selected snapshot to a test logic for use in a test scenario.

According to further examples, the present disclosure describes datacenters operable to generate a test vector for health monitoring using snapshots. An example datacenter may include a plurality of servers configured to execute one or more virtual machines on each server, and a virtual machine manager configured to manage the virtual machines, and a snapshot processing module configured to collect a series of snapshots of an application executed at the datacenter, where the snapshots include metric values associated with monitored health aspects of the application, select a snapshot with an operating state desired as part of a test suite, where operating states associated with the snapshots may be assessed as the snapshots may be captured, and provide the selected snapshot to a test logic for use in a test scenario.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to compositions, methods, apparatus, systems, devices, and/or computer program products related to health monitoring using snapshot backups through test vectors.

Briefly stated, technologies are described for health monitoring using snapshot backups through test vectors. In some examples, health of an application deployed at a datacenter may be monitored and key metrics recorded in the metadata of progressive backup snapshots of an instance of the application such that warning metrics can be reviewed retrospectively upon failure of the instance and a snapshot can be automatically selected for restoration of the application instance based on lack of high incidence of suspect metric values. Moreover, an operating state associated with snapshot backups may be assessed as the snapshots are captured and selected ones with operating conditions desired as part of a test suite may be saved for use as test scenarios. In particular, state information from added or existing deployment monitoring may be used by a test logic process to evaluate whether each snapshot is needed for testing scenarios.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. Tenants may also be part of the same organization as operates the datacenter. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with conventional configurations, where each service provider would execute their applications and have their users access those applications on the retail services own servers physically located on retail service premises. One result of the networked approach described herein is that customers like the retail service may move their hosted services/applications from one datacenter to another without the users noticing a difference.

Figure 1:
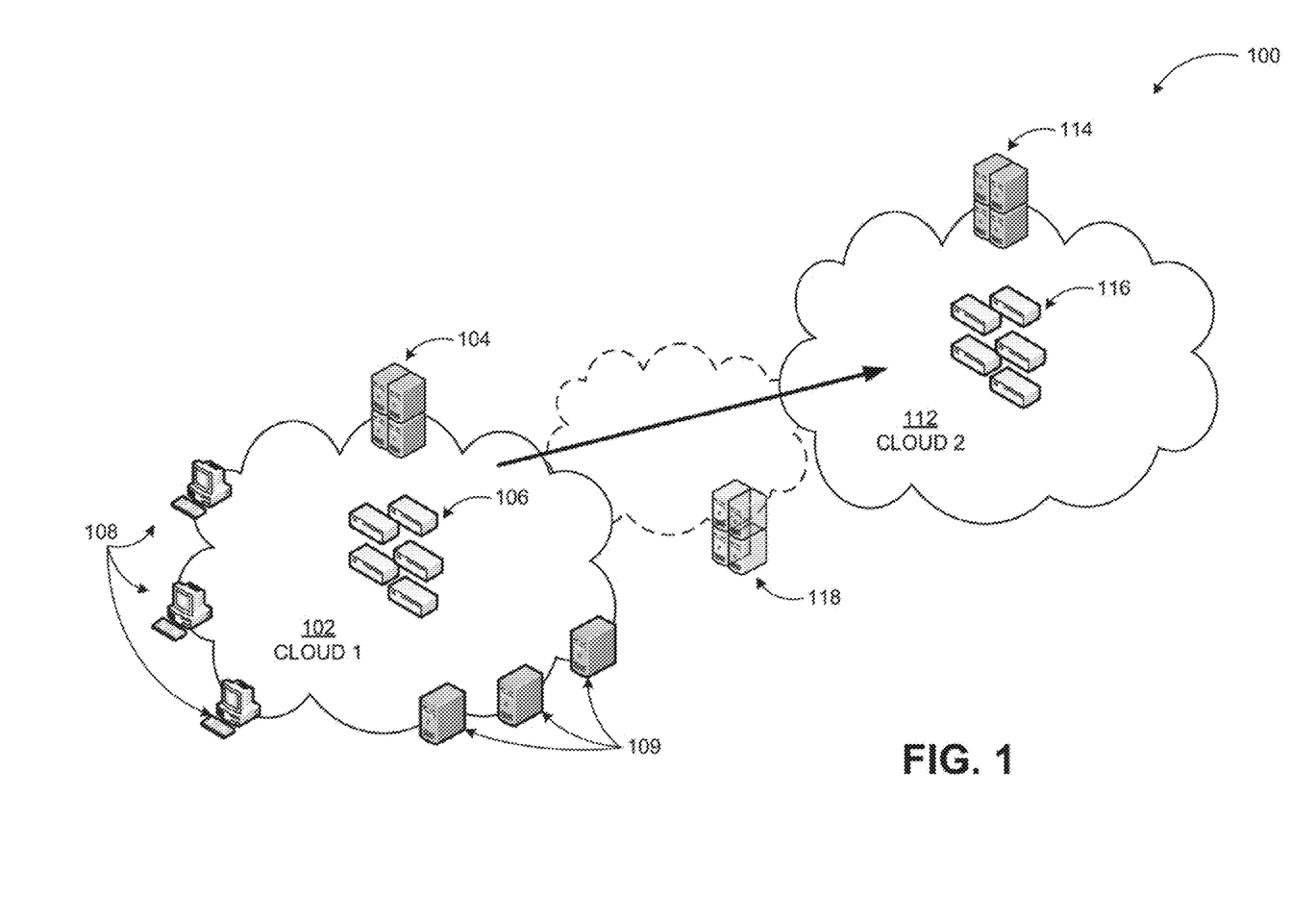
FIG. 1 illustrates an example system where a snapshot backup system may be implemented.

FIG. 1 illustrates an example system, where a snapshot backup system may be implemented, arranged in accordance with at least some embodiments as described herein.

As shown in a diagram 100, a service provider such as a cloud 1 (102) may host services such as various applications, data storage, data processing, or comparable ones for individual or enterprise customers 108 and 109. The cloud 1 (102) may include one or more datacenters providing the services and may employ one or more servers 104 and/or one or more special purpose devices 106 such as firewalls, routers, and so on. In providing the services to its customers, the cloud 1 (102) may employ multiple servers, special purpose devices, physical or virtual data stores, etc. Thus, an application hosted or data stored by the cloud 1 (102) for a customer may involve a complex architecture of hardware and software components.

Cloud-based service providers or datacenters may have disparate architectures and provide similar services but with distinct parameters. For example, data storage capacity, processing capacity, server latency, and similar aspects may differ from cloud to cloud. Additionally, the service parameters may vary depending on the provided service. Migrating an application from cloud 1 (102) to a new cloud (112) may involve dealing with potentially incompatible cloud application programming interfaces as well as addressing issues at each level of an application stack, as a source cloud and destination cloud may have differences in hypervisors, operating systems, databases, storage and network configurations, and drivers.

In the diagram 100, the cloud 1 (102) may be a source datacenter and cloud 2 (112) may be a destination datacenter in a migration process. Similar to the cloud 1 (102), the cloud 2 (112) may also employ one or more servers 114 and one or more special purpose devices 116 to provide its services. In some example embodiments, when deciding to transfer or migrate an application from a source datacenter to a destination datacenter, it may be desirable to test a performance of an application at the destination datacenter in order to determine if the migration of the application to the destination datacenter will be successful. Additionally, when testing performance of an application, it may be useful to test the performance of the application over a range of operating states including specifically known stress states to determine how the application may perform when operating at extreme or stressed conditions.

In some example embodiments, the source datacenter may continuously perform a backup process in order to preserve and archive application data for future restoration and recovery in the event of corruption, failure or data loss. One example backup process may include a snapshot and replication process, in which snapshots of a system or an application running at the datacenter are collected incrementally over time. A snapshot may capture a state of the application at a particular point in time, and subsequent snapshots may capture changed data from the previous snapshot. The application may be replicated and restored by assembling the application from an initial snapshot and the captured changes from snapshot to snapshot, enabling for a relatively quick application restoration. Additionally, the snapshot and replication process may be implemented in conjunction with a performance monitoring of the application, which may be executed at the source datacenter. The performance monitoring may include monitoring states of application and health metrics over a range of operating conditions.

In a system according to embodiments, snapshots of the application may represent a record of states of the application over a wide range of operating conditions. In order to test a performance of the application over the range of operating conditions, a snapshot of the application operating at particular operating conditions may be selected and tested at the destination datacenter to evaluate the performance of the application at the destination datacenter.

Figure 2:
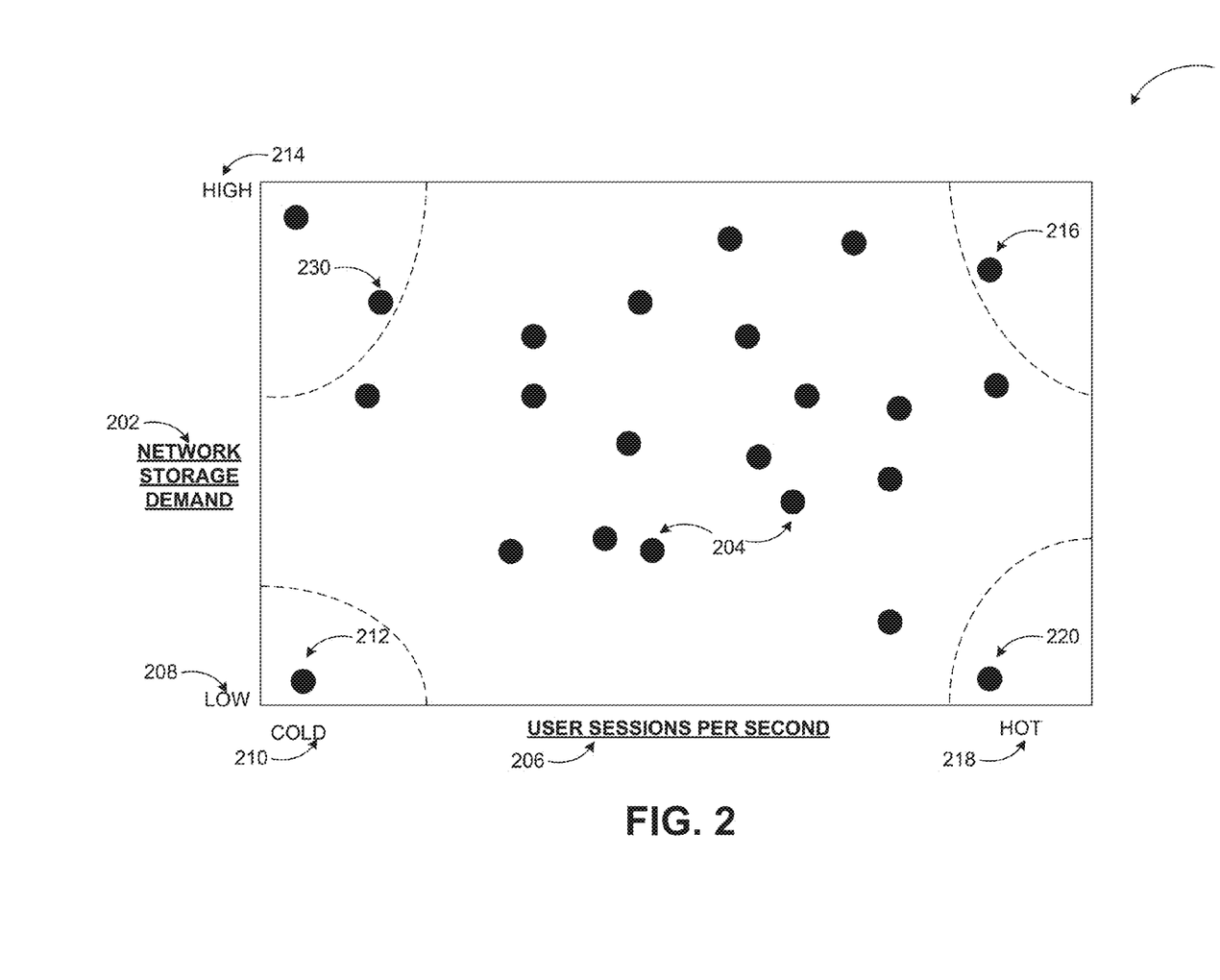
FIG. 2 illustrates a conceptual image of a population of historical server images across a two dimensional distribution based on user sessions per second and network storage demand.

FIG. 2 illustrates a conceptual image of a population of historical server images across a two dimensional distribution based on user sessions per second and network storage demand, arranged in accordance with at least some embodiments as described herein.

In a system according to embodiments, a performance of the application over a range of operating states and health metrics including specifically known stress states may be tested to determine how the application may perform when operating at extreme or stressed conditions. As illustrated in a diagram 200, example performance metrics 202, 206 of an application (to evaluate performance at a destination datacenter) may include a user sessions per second 206 and a network storage demand 202. It may be desirable to test the application operating at the destination datacenter under various operating conditions including selected stressed states for the each of the performance metrics. Example stressed states (i.e., in a state with a particular property of stress) for the performance metrics may include "hot" 218, "cold" 210, "low" 208, and "high" 214 as demonstrated at the corners of the diagram 200.

A testing scenario to evaluate the application at a destination datacenter may be to identify snapshots 220, 230, 216, 212, of the application operating at the varied states. As previously described, other snapshots such as a snapshots 204 may be captured during a performance monitoring of the application under normal operating states of the application. The snapshots 220, 230, 216, 212 identified at the stressed states may be selected and preserved as test vectors or test units as part of a test suite for evaluating a performance of the application at a destination datacenter.

In a system according to embodiments, an application owner may define desired operating states for a testing scenario to evaluate performance of an application at a destination datacenter. During the performance monitoring and snapshot capture of the application at the source datacenter, a test logic may be applied to identify and collect snapshots when the application naturally operates within the defined operating states. When the snapshots of the application operating in the defined operating states are identified, each identified snapshot may be converted into a test vector, and preserved in a collection of snapshots.

Figure 3A:
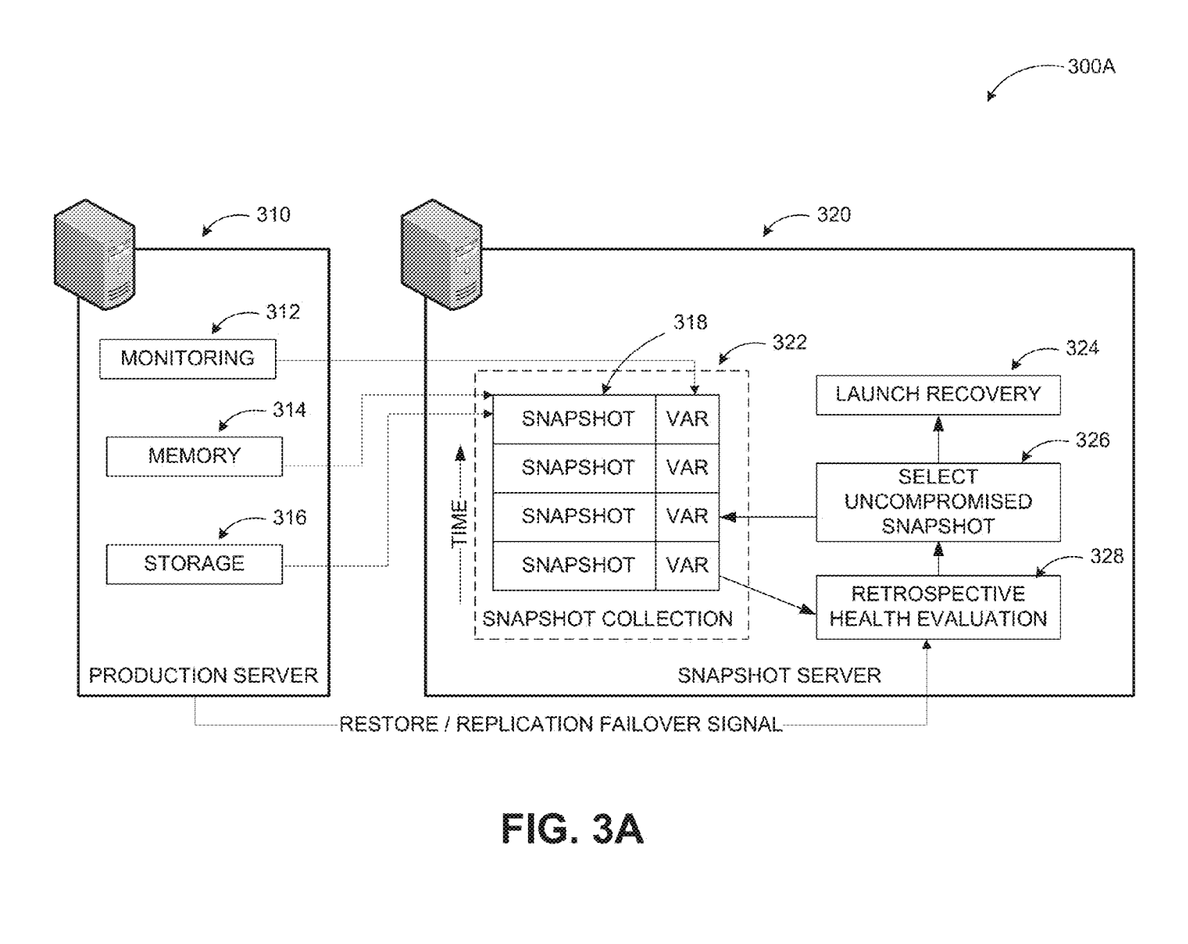
FIGS. 3A and 3B illustrate example systems to monitor performance utilizing snapshot backup based test vector for destination cloud environment.

FIG. 3A illustrates an example system to monitor performance utilizing snapshot backup based test vector for a cloud environment, arranged in accordance with at least some embodiments as described herein.

As previously described, a snapshot and replication process may be implemented in conjunction with a performance monitoring of an application, which may be executed at a source datacenter. The performance monitoring may include monitoring states of the application, such as processor demand, memory usage, threading, user sessions per second and network storage demand, and health metrics, where health metrics may include availability, response time, channel capacity, latency, completion time, service time, bandwidth, throughput, relative efficiency, scalability, performance per watt, compression ratio, instruction path length and speed up, over the range of operating conditions.

In some example embodiments, as illustrated in a diagram 300A, a production server 310 executed at the source data center may facilitate performance monitoring and snapshot capture of an application being executed at the source datacenter for restoration purposes. The production server 310 may enable the capture of backup snapshots of a memory 314 and a storage 316 at the source datacenter which may be collected by a snapshot server 320 associated with the production server 310. The production server 310 may also provide health and performance monitoring 312 of the application at the source datacenter in order to monitor performance states and metrics of the application at each captured snapshot.

In a system according to embodiments, the performance monitoring 312 may be implemented to evaluate various operating states of the application. During the performance monitoring 312, the snapshot server 320 may collect a series of snapshots of the application over incremental periods of time. Each collected snapshot 318 may include health metrics associated with each collected snapshot 318 such that each snapshot 318 may represent a range and variety of performance states of the application. Performance monitoring 312 may be collected at a separate performance monitoring server for eventual association with the snapshot backups. Identifying the health metrics at each collected snapshot may facilitate performance monitoring, identifying and diagnosing a compromised snapshot and sources of a failure, and restoring the application to an uncompromised state.

In one example scenario, if a failure is detected during performance monitoring 312 at the production server 310, the snapshot server 320 may implement a retrospective health evaluation process 328 to identify where the failure occurred, and to identify what may have caused the failure. At the health evaluation process 328, the snapshot server 320 may evaluate the snapshots 318 including associated health metrics and the failure together to identify which health metrics appear to indicate a compromise and failure of the application. In one example, evaluation process 328 may use final or near-final performance measurements of a failed server to determine what performance variables signal the failure-inducing problem and selection 326 may select a snapshot that occurs before the failure-inducing problem started. In another example, a retrospective health evaluation process 328 may be able to see signature problem patterns that were not evident at the time of operation so that selection 326 may select a snapshot backup before the beginning of the problem signature. A snapshot may be selected for restoration based on lack of high incidence of suspect metric values. Subsequently, a recovery process may be initiated in which the snapshot server 320 may select an uncompromised (non-failing) snapshot 326, and may launch a recovery measure 324 based on the uncompromised snapshot that provides most recent data that is non-failing and stable.

Figure 3B:
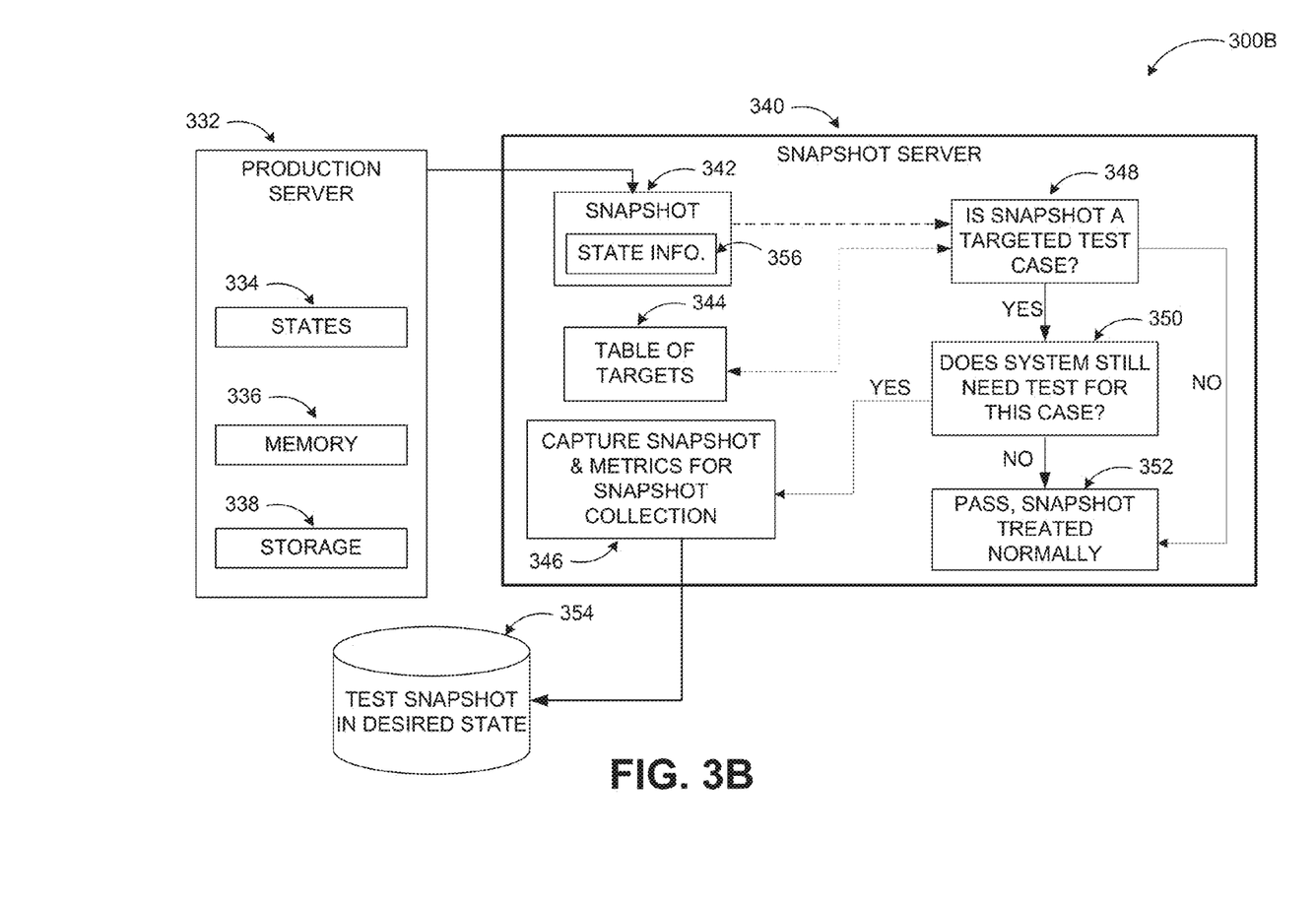

FIG. 3B illustrates an example system to monitor performance utilizing snapshot backup based test vector for destination cloud environment, arranged in accordance with at least some embodiments as described herein.

As previously discussed, a server may monitor performance and capture snapshots of an application being executed at a source datacenter at various operating states for application recovery and restoration purposes. For example, as illustrated in a diagram 300B, a production server 332 executed at the source datacenter may facilitate performance monitoring of the application at various operating states 334 (which may include performance monitoring 312), and a snapshot server 340 associated with the production server 332 may capture snapshots 342 of the application including memory 336 and storage 338 components of the application. The snapshot server 340 may also be configured as a monitoring server external to the source computing environment adapted to monitor a performance of the application and capture the snapshots 342 of the application at a range of operating states. As discussed above, monitoring may also be via a separate server. Furthermore, the snapshot server 340 may be configured as a state information server as part of the source computing environments or external to the source computing environment for monitoring performance and capturing snapshots of the application. Each captured snapshot 342 may include operating state information 356 for the application when the snapshot is captured, where the state information 356 may include a range of operating states and health performance metrics of the application.

In a system according to some embodiments, a series of the snapshots 342 representing a wide range of operating states and performance metrics of the application may be collected (346) and preserved in a collection of snapshots. The collection of snapshots 322 may represent snapshots of the application operating at defined operating conditions desired for testing at a destination datacenter, and in some embodiments, a snapshot may be selected from the collection of snapshots 322 to run at the destination datacenter to evaluate performance of the application. The snapshot(s) may be selected based on one or more criteria such as predefined stress conditions, expected stress conditions, normal operating conditions, and similar ones. A historical record of the application operating at the current datacenter may also be used in determining which snapshots to select to evaluate performance at the destination datacenter. The collection of snapshots 322 may be hosted at the snapshot server 340 which may be integrated with the production server of the source datacenter, or in other embodiments, may be a separate server external to the source datacenter.

In one example embodiment, a table 344 of desired test targets may also be hosted at the snapshot server 340. The table 344 of desired test targets may include defined operating states and metrics that an application owner desires to test as part of a test suite at a destination datacenter or in other tests. When a snapshot is captured at the snapshot server 340, the snapshot server 340 may compare 348 the state information 356 of the captured snapshot to the table 344 of test targets, to determine whether the snapshot is operating at a desired operating state for a test suite at the destination datacenter. If a snapshot is identified as operating in a desired operating state, the snapshot server 340 may determine 350 whether the collection of snapshots 322 already includes a snapshot for the operating state. If the snapshot is not already in the collection, the identified snapshot may be selected and preserved as a test unit, for example, as part of a test suite in the collection of snapshots 322 for testing. Additionally, upon selection of the snapshot for addition to the collection of snapshots 322, incoming and outgoing messages may be collected for a predefined test period and state information for the snapshot may be observed 354. The selected snapshot and the collected messages may be packaged together into the test unit as part of the test suite in the collection of snapshots 322. Furthermore, if a captured snapshot is determined not to be operating at a desired operating state for a test suite, or if the collection of snapshots 322 already includes a snapshot for the desired operating state, then the snapshot may be stored 352 at the snapshot server for recovery/restoration purposes, as well as for analysis of potential destination datacenters.

In one example embodiment, upon collection of a predefined number of test units of snapshots in the collection of snapshots 346, one or more of the snapshot test units, including the collected messages, may be restored at the destination datacenter. The selected snapshot test unit may be provided to a test logic being executed at the destination datacenter, where the test logic may be configured to facilitate restoration and execution of the selected snapshot test unit. The test logic may be executed at an analytics server hosted at the destination datacenter for running the snapshot test unit. After restoring and running the selected snapshot test unit for the application at the destination datacenter, the performance and robustness of the application at the destination datacenter may be evaluated. For example, a final state of the application executed at the destination datacenter may be compared to a final state that occurred at the source computing environment in order to evaluate the performance and robustness of the application at the destination datacenter.

Figure 4:
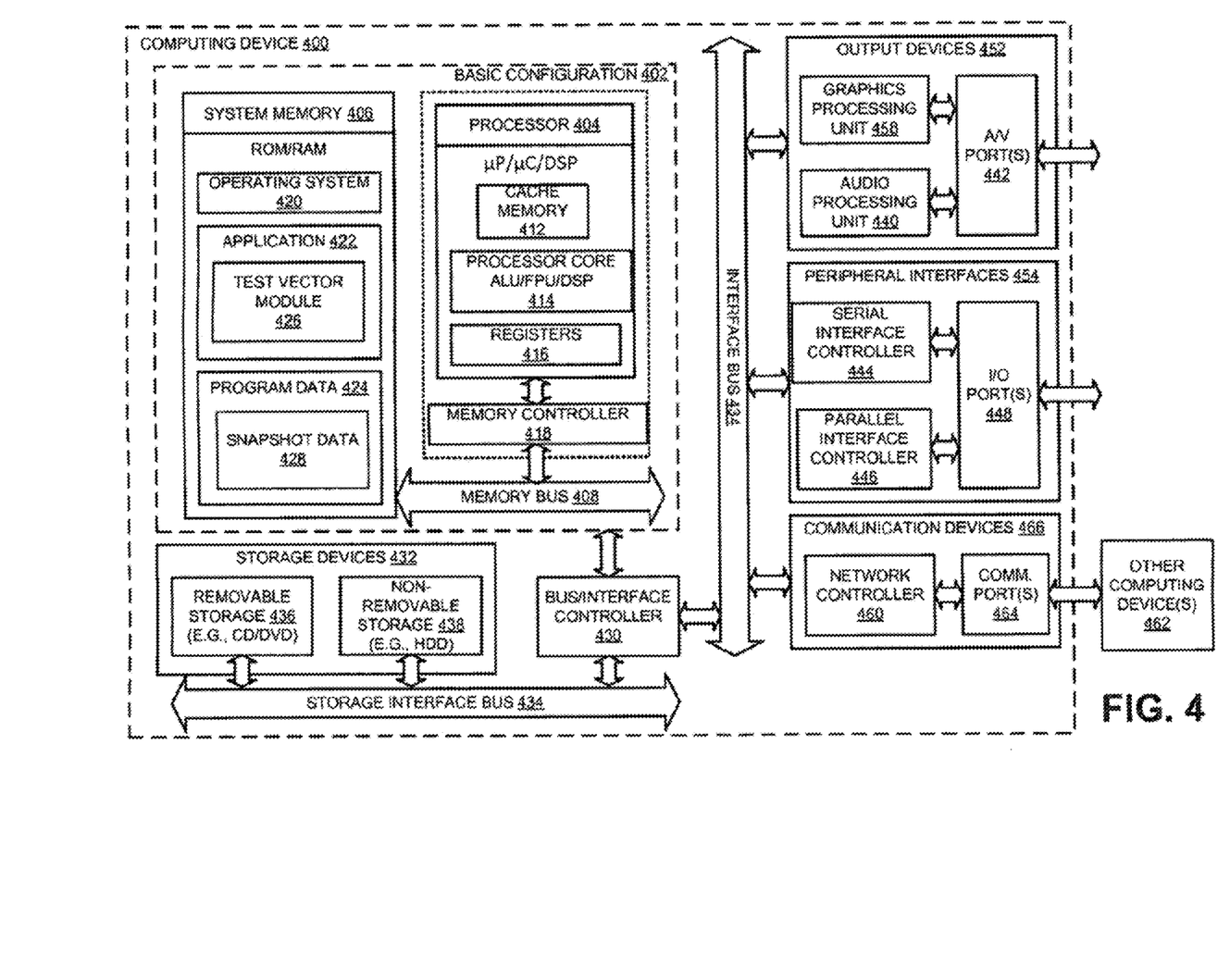
FIG. 4 illustrates a general purpose computing device, which may be used to monitor performance utilizing snapshot backup based test vector for destination cloud environment.

FIG. 4 illustrates a general purpose computing device, which may be used to migrate an application from a source to a destination cloud computing environment, arranged in accordance with at least some embodiments as described herein.

For example, the computing device 400 may be used as servers 104, 114, or 118 of FIG. 1. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The applications 422 may include a test vector module 426, which may facilitate selecting a snapshot with desired operating states for converting to a test vector and adding to the collection of snapshots as part of a test suite as described herein. The program data 424 may include, among other data, snapshot data 428 including operating states and health metrics data, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 452, one or more peripheral interfaces 454, and one or more communication devices 466) to the basic configuration 402 via the bus/interface controller 430. Some of the example output devices 452 include a graphics processing unit 458 and an audio processing unit 440, which may be configured to communicate to various external devices such as a display or speakers via one or more A/V ports 442. One or more example peripheral interfaces 454 may include a serial interface controller 444 or a parallel interface controller 446, which may be configured to communicate with external devices such as input devices (e.g., keyboard, mouse, pen, voice input device, touch input device, etc.) or other peripheral devices (e.g., printer, scanner, etc.) via one or more I/O ports 448. An example communication device 466 includes a network controller 460, which may be arranged to facilitate communications with one or more other computing devices 462 over a network communication link via one or more communication ports 464. The one or more other computing devices 462 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods for selecting snapshots for testing an application at a destination datacenter. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 5:
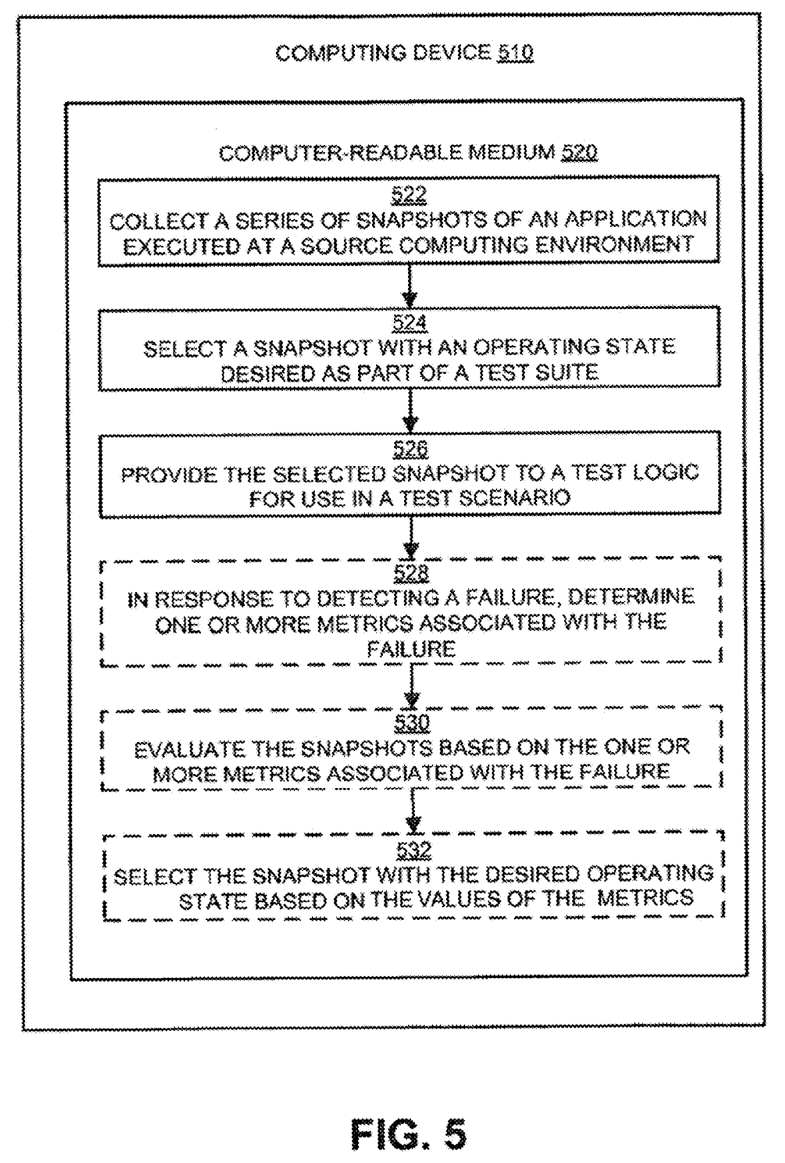
FIG. 5 is a flow diagram illustrating an example method that may be performed by a computing device such as the computing device in FIG. 4.

FIG. 5 is a flow diagram illustrating an example method that may be performed by a computing device such as the device 400 in FIG. 4, arranged in accordance with at least some embodiments described herein.

Example methods may include one or more operations, functions or actions as illustrated by one or more of blocks 522, 524, 525, 528, 530 and/or 532. The operations described in the blocks 522 through 532 may also be stored as computer-executable instructions in a computer-readable medium such as a computer-readable medium 520 of a computing device 510.

An example process for generating test vectors for datacenter health monitoring using snapshots may begin with block 522, "COLLECT A SERIES OF SNAPSHOTS OF AN APPLICATION EXECUTED AT A SOURCE COMPUTING ENVIRONMENT", where a snapshot server may collect a series of snapshots of an application executed a source datacenter, where each collected snapshot may represent a range and variety of operating states and performance metrics of the application.

Block 522 may be followed by block 524, "SELECT A SNAPSHOT WITH AN OPERATING STATE DESIRED AS PART OF A TEST SUITE", where the snapshot server may consult a table of desired testing states to identify application operating states desired to test as part of a test suite. A snapshot operating at a desired operating state may be selected for future testing at a destination datacenter.

Block 524 may be followed by block 526, "PROVIDE THE SELECTED SNAPSHOT TO A TEST LOGIC FOR USE IN A TEST SCENARIO," where the snapshot server may provide the selected snapshot to a test logic at the destination datacenter for use in a test scenario, where the selected snapshot may be restored and run at the destination datacenter for performance evaluation.

Block 526 may be followed by optional block 528, "IN RESPONSE TO DETECTING A FAILURE, DETERMINE ONE OR MORE METRICS ASSOCIATED WITH THE FAILURE," where a performance failure of the application may be detected, and the snapshot server may evaluate health metrics associated with a snapshot of the application where the failure occurred.

Block 528 may be followed by optional block 530, "EVALUATE THE SNAPSHOTS BASED ON THE ONE OR MORE METRICS ASSOCIATED WITH THE FAILURE," where the snapshot and associated health metrics may be evaluated in order to identify and diagnose a compromised snapshot and a source of a failure.

Block 530 may be followed by optional block 532, "SELECT THE SNAPSHOT WITH THE DESIRED OPERATING STATE BASED ON THE VALUES OF THE METRICS," where the snapshot server may select a snapshot with the desired operating state based on health and performance metrics.

The blocks included in the above described process are for illustration purposes. Generating test vectors for datacenter health monitoring using snapshots may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 6:
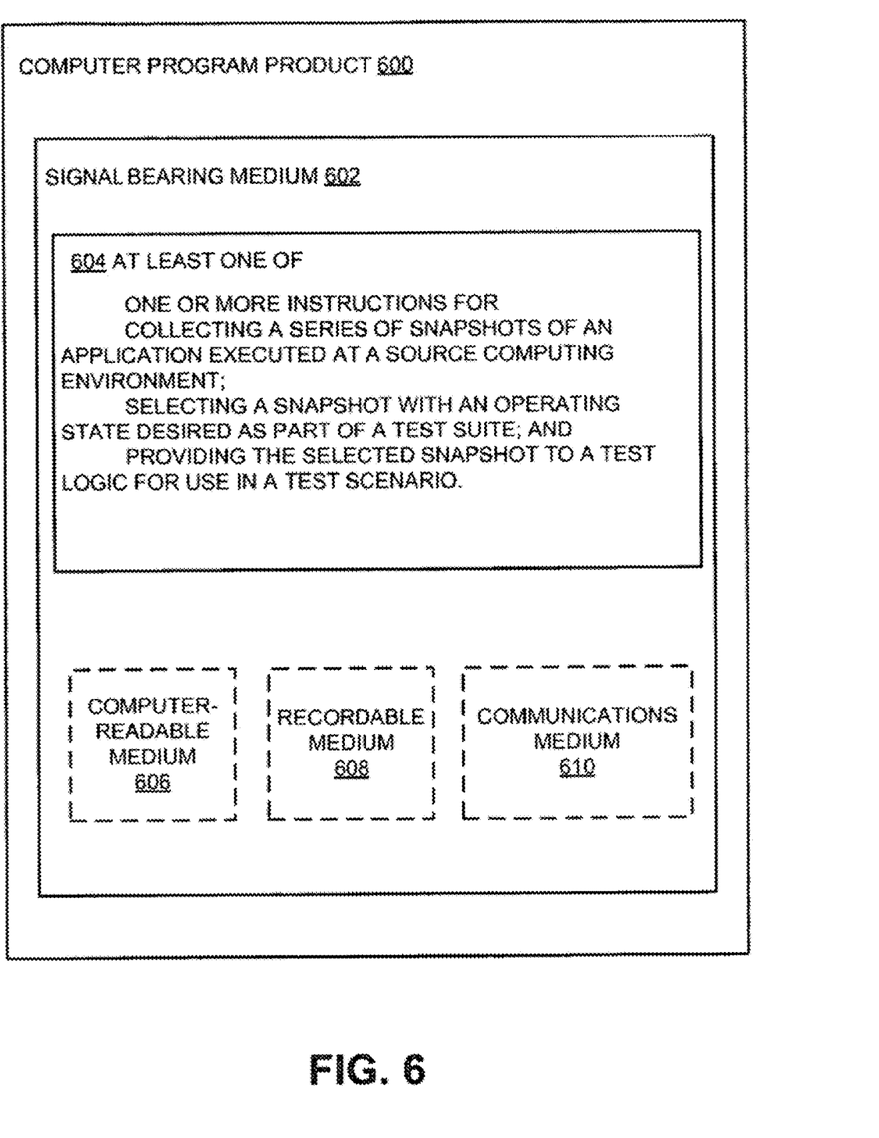
FIG. 6 illustrates a block diagram of an example computer program product, all arranged in accordance with at least some embodiments as described herein.

FIG. 6 illustrates a block diagram of an example computer program product, arranged in accordance with at least some embodiments described herein.

In some examples, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, the test vector module 426 may undertake one or more of the tasks shown in FIG. 6 in response to the instructions 604 conveyed to the processor 404 by the signal bearing medium 602 to perform actions associated with generating test vectors for datacenter health monitoring using snapshots as described herein. Some of those instructions may include, for example, instructions for collecting a series of snapshots of an application executed at a source computing environment, selecting a snapshot with an operating state desired as part of a test suite, and providing the selected snapshot to a test logic for use in a test scenario, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the computer program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, the present disclosure describes a method for generating a test vector in datacenter health monitoring using snapshots. The method may include collecting a series of snapshots of an application executed at a source computing environment, where the snapshots include metric values associated with monitored health aspects of the application, selecting a snapshot with an operating state desired as part of a test suite, where operating states associated with the snapshots may be assessed as the snapshots may be captured, and providing the selected snapshot to a test logic for use in a test scenario. The snapshots of the application may be captured during a performance monitoring of the application.

According to some examples, the method may include in response to detecting a failure, determining one or more metrics associated with the failure, evaluating the snapshots based on the one or more metrics associated with the failure, and selecting the snapshot with the desired operating state based on values of the one or more metrics associated with the failure captured in the snapshot. The method also may include launching a recovery measure based on the selected snapshot. The method may also include testing the application at a destination computing environment using the test scenario. The snapshots include system states associated with one or more of a processor demand, a memory usage, a threading.

According to some examples, the method may also include upon selection of the snapshot, capturing incoming and outgoing messages for a predefined test period, observing the operating state again, and packaging the snapshot and the captured messages into a test unit. The method may also include upon collection of a predefined number of test units, restoring the test units at a destination computing environment using the captured messages, and evaluating a robustness of the application at the destination computing environment and a final state of the application in comparison to a final state that occurred at the source computing environment.

According to other examples, the method may also include comparing the selected snapshot to a collection of snapshots deemed to be desirable for testing, and in response to a determination that the selected snapshot may be not in the collection of snapshots deemed to be desirable for testing, adding the selected snapshot to the collection. The method may also include receiving another snapshot after a predefined period and comparing the other snapshot with the selected snapshot prior to the addition of the selected snapshot to the collection. The method may also include receiving the snapshots from one of a production server at the source computing environment, a monitoring server external to the source computing environment, and a state information server at the source computing environment. The method may also include providing the selected snapshot to an analytics server.

According to other examples, the present disclosure also describes a server operable to generate a test vector for datacenter health monitoring using snapshots. The server may include a memory configured to store instructions; and a processor coupled to the memory, the processor configured to execute a snapshot processing module, where the snapshot processing module may be configured to collect a series of snapshots of an application executed at a source computing environment, where the snapshots include metric values associated with monitored health aspects of the application, select a snapshot with an operating state desired as part of a test suite, where operating states associated with the snapshots may be assessed as the snapshots may be captured, and provide the selected snapshot to a test logic for use in a test scenario.

According to some examples, the snapshots of the application may be captured during a performance monitoring of the application. The snapshot processing module may be further configured to in response to detecting a failure, determine one or more metrics associated with the failure, evaluate the snapshots based on the one or more metrics associated with the failure, and select the snapshot with the desired operating state based on values of the one or more metrics associated with the failure captured in the snapshot.

According to some examples, the server may also include a recovery module configured to launch a recovery measure based on the selected snapshot. The test logic may be configured to test the application at a destination computing environment using the test scenario. The snapshots include system states associated with one or more of a processor demand, a memory usage, a threading.

According to other examples, the snapshot processing module may be further configured to upon selection of the snapshot, capture incoming and outgoing messages for a predefined test period, observe the operating state again, and package the snapshot and the captured messages into a test unit. The test logic may be further configured to upon collection of a predefined number of test units, restore the test units at a destination computing environment using the captured messages, and evaluate a robustness of the application at the destination computing environment and a final state of the application in comparison to a final state that occurred at the source computing environment.

According to further examples, the snapshot processing module may be further configured to receive the snapshots with state information. The snapshot processing module may be further configured to maintain a table of desired test targets compare the state information from the selected snapshot to contents of the table of the desired test targets, and in response to a determination that the state information may be not in the table of the desired test targets, add the selected snapshot to a collection of desired snapshots.

According to further examples, the snapshot processing module may be further configured to receive another snapshot after a predefined period and compare the other snapshot with the selected snapshot prior to the addition of the selected snapshot to the collection. The snapshot processing module may be further configured to receive the snapshots from one of a production server at the source computing environment, a monitoring server external to the source computing environment, and a state information server at the source computing environment.

According to yet other examples, the snapshot processing module may be further configured to provide the selected snapshot to an analytics server. The snapshot processing module may be executed in one of a snapshot server, a monitoring server, and an analytics server implemented in one of the source computing environment, a destination computing environment, and a third party entity.

According to further examples, the present disclosure describes a datacenter operable to generate a test vector for health monitoring using snapshots. The datacenter may include a plurality of servers configured to execute one or more virtual machines on each server, and a virtual machine manager configured to manage the virtual machines, and a snapshot processing module configured to collect a series of snapshots of an application executed at the datacenter, where the snapshots include metric values associated with monitored health aspects of the application, select a snapshot with an operating state desired as part of a test suite, where operating states associated with the snapshots may be assessed as the snapshots may be captured, and provide the selected snapshot to a test logic for use in a test scenario.

According to some examples, the snapshots of the application may be captured during a performance monitoring of the application. The snapshot processing module may be further configured to in response to detecting a failure, determine one or more metrics associated with the failure, evaluate the snapshots based on the one or more metrics associated with the failure, and select the snapshot with the desired operating state based on values of the one or more metrics associated with the failure captured in the snapshot.

According to some examples, the datacenter may also include a recovery module configured to launch a recovery measure based on the selected snapshot. At least one of the recovery module and the snapshot processing module may be part of the virtual machine manager. The test logic may be configured to test the application at a destination computing environment using the test scenario. The snapshots include system states associated with one or more of a processor demand, a memory usage, a threading.

According to some examples, the snapshot processing module may be further configured to upon selection of the snapshot, capture incoming and outgoing messages for a predefined test period, observe the operating state again, and package the snapshot and the captured messages into a test unit. The test logic may be further configured to upon collection of a predefined number of test units, restore the test units at a destination datacenter using the captured messages, and evaluate a robustness of the application at the destination datacenter and a final state of the application in comparison to a final state that occurred at the datacenter.

According to other examples, the snapshot processing module may be further configured to receive the snapshots with state information. The snapshot processing module may be further configured to maintain a table of desired test targets, compare the state information from the selected snapshot to contents of the table of the desired test targets, and in response to a determination that the state information is not in the table of the desired test targets, add the selected snapshot to a collection of desired snapshots.

According to other examples, the snapshot processing module may be further configured to receive another snapshot after a predefined period and compare the other snapshot with the selected snapshot prior to the addition of the selected snapshot to the collection. The snapshot processing module may be further configured to receive the snapshots from one of a production server at the datacenter, a monitoring server external to the datacenter, and a state information server at the datacenter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a test vector in datacenter health monitoring using snapshots, the method comprising:
    collecting a series of the snapshots and metric values associated with monitored health aspects of an application, wherein the application is executed at a source computing environment;
    identifying state information associated with the series of the snapshots, wherein the state information includes a range of operating states and health performance metrics associated the application;
    in response to assessing the state information associated with the series of the snapshots, selecting a snapshot from the series of the snapshots based on a historical record associated with the application operating at the source computing environment, wherein the selected snapshot is associated with an operating state from the range of operating states;
    preserving the snapshot as the test vector associated with a test suite, wherein the test vector is utilized to evaluate a performance of the application at a destination computing environment;
    capturing incoming messages and outgoing messages for a test period;
    packaging the selected snapshot from the series of the snapshots and a captured message of the incoming messages and the outgoing messages into a number of test units; and
    providing the number of test units to a test logic of the test suite for use in a test scenario.

2. The method of claim 1, further comprising:
    in response to collecting the number of test units, restoring at least one test unit at the destination computing environment using the captured message of the incoming messages and the outgoing messages; and
    comparing a final state of the application executed at the destination computing environment to a final state of the application executed at the source computing environment to evaluate a robustness of the application at the destination computing environment.

3. The method of claim 1, further comprising:
    selecting a subset of snapshots for testing, wherein the subset of the snapshots include one or more conditions that include a predefined stress condition, a normal operating condition, and an expected stress condition;
    comparing the one or more conditions between the selected snapshot and the subset of the snapshots; and
    in response to a determination of a failure to match the one or more conditions between the selected snapshot and the subset of the snapshots, adding the selected snapshot to the subset of the snapshots.

4. The method of claim 3, further comprising:
    receiving another snapshot from the series of the snapshots after a period; and
    comparing the other snapshot with the selected snapshot prior to the addition of the selected snapshot to the subset of the snapshots.

5. The method of claim 1, further comprising:
    receiving the series of the snapshots from one of a production server at the source computing environment, a monitoring server external to the source computing environment, and a state information server at the source computing environment.

6. The method of claim 1, further comprising:
    providing the selected snapshot to an analytics server.

7. A server operable to generate a test vector for datacenter health monitoring using snapshots, the server comprising:
    a memory configured to store instructions; and
    a processor coupled to the memory, the processor configured to execute a snapshot processing module, wherein the snapshot processing module is configured to:
        collect a series of the snapshots and metric values associated with monitored health aspects of an application, wherein the application is executed at a source computing environment;
        identify state information associated with the series of the snapshots, wherein the state information includes a range of operating states and health performance metrics associated the application;
        in response to assessing the state information associated with the series of the snapshots, select a snapshot from the series of the snapshots based on a historical record associated with the application operating on the source computing environment, wherein the selected snapshot is associated with an operating state from the range of operating states;
        preserve the snapshot as the test vector associated with a test suite, wherein the test vector is utilized to evaluate a performance of the application at a destination computing environment;
        capture incoming messages and outgoing messages for a test period;
        package the selected snapshot from the series of the snapshots and a captured message of the incoming messages and the outgoing messages into a number of test units; and
        provide the number of test units to a test logic of the test suite for use in a test scenario.

8. The server of claim 7, wherein the series of the snapshots of the application are captured during a performance monitoring of the application.

9. The server of claim 7, wherein the test logic is configured to test the application at the destination computing environment using the test scenario.

10. The server of claim 7, wherein the series of the snapshots include system states associated with one or more of a processor demand, a memory usage, a threading, user sessions per second, a network storage demand, an availability, a response time, a channel capacity, a latency, a completion time, a service time, a bandwidth, a throughput, a relative efficiency, a scalability, a performance per watt, a compression ratio, an instruction path length, a rate of change in processor demand, and a rate of change in memory usage.

11. The server of claim 7, wherein the test logic is further configured to:
    in response to collecting the number of test units, restore at least one test unit at the destination computing environment using the captured message of the incoming messages and the outgoing messages; and
    compare a final state of the application executed at the destination computing environment to a final state of the application executed at the source computing environment to evaluate a robustness of the application at the destination computing environment.

12. The server of claim 7, wherein the snapshot processing module is further configured to:
    maintain a table of desired test targets;
    compare the state information from the selected snapshot to contents of the table of the desired test targets; and
    in response to a determination that the state information is not in the table of the desired test targets, add the selected snapshot to a collection of desired snapshots.

13. The server of claim 12, wherein the snapshot processing module is further configured to:

receive another snapshot from the series of the snapshots after a period; and compare the other snapshot with the selected snapshot prior to the addition of the selected snapshot to the subset of the snapshots.

14. The server of claim 7, wherein the snapshot processing module is further configured to provide the selected snapshot to an analytics server.

15. The server of claim 7, wherein the snapshot processing module is executed in one of a snapshot server, a monitoring server, and an analytics server implemented in one of the source computing environment, a destination computing environment, and a third party entity.

16. A datacenter operable to generate a test vector for health monitoring using snapshots, the datacenter comprising:

servers configured to execute one or more virtual machines each server; and a virtual machine manager configured to manage the one or more virtual machines; and a snapshot processing, module configured to:

collect a series of the snapshots and metric values associated monitored health aspects an application, wherein the application is executed at the datacenter;

identify state information associated with the series of the snapshots, wherein the state information includes a range of operating states and health performance metrics associated the application;

in response to assessing the state information associated with the series of the snapshots, select a snapshot from the series of the snapshots based on a historical record associated with the application operating on the datacenter, wherein the selected snapshot is associated with an operating state from the range of operating states;

preserve the snapshot as the test vector associated with a test suite, wherein the test vector is utilized to evaluate a performance of the application at a destination datacenter;

provide the number of test units to a test logic of the test suite for use in a test scenario; and in response to detecting a failure of an application, determine one or more metrics associated with the failure;

evaluate the series of the snapshots based on the one or more metrics associated with the failure, wherein the series of the snapshots are collected with associated values for the application executed at the datacenter;

select another snapshot from the series of the snapshots having another desired operating state from the range of operating states to perform a failure recovery based on the values of the one or more metrics associated with the failure captured in the series of the snapshots; and launch a recovery measure based on the other snapshot at a recovery module.

17. The datacenter of claim 16, wherein the test logic is configured to test the application at the destination datacenter using the test scenario.

18. The datacenter of claim 16, wherein the snapshot processing module is further configured to:

upon selection of the snapshot from the series of the snapshots, capture incoming messages and outgoing messages for a test period; and package the selected snapshot from the series of the snapshots and a captured message of the incoming messages and the outgoing messages into a number of test units.

19. The datacenter of claim 18, wherein the test logic is further configured to:

in response to collecting the number of test units, restore at least one test unit at the destination datacenter using the captured message of the incoming messages and the outgoing messages; and compare a final state of the application executed at the destination datacenter to a final state of the application executed at the datacenter to evaluate a robustness of the application at the destination datacenter.

20. The datacenter of claim 16, wherein the snapshot processing module is further configured to:

maintain a table of desired test targets;

compare the state information from the selected snapshot to contents of the table of the desired test targets; and in response to a determination that the state information is not in the table of the desired test targets, add the selected snapshot to a collection of desired snapshots.

21. The datacenter of claim 16, wherein the snapshot processing module is further configured to receive the series of the snapshots from one of a production server at the datacenter, a monitoring server external to the datacenter, and a state information server at the datacenter.

* * * * *